United States Patent [19]

Elhaus

[11] Patent Number: 4,554,851
[45] Date of Patent: Nov. 26, 1985

[54] APPARATUS FOR SEVERING EXTRUDED LIGHT SECTIONAL MEMBERS

[76] Inventor: Friedrich W. Elhaus, Dorfstrasse 21, 7761 Moos, Fed. Rep. of Germany

[21] Appl. No.: 635,533

[22] Filed: Jul. 30, 1984

[30] Foreign Application Priority Data

Aug. 3, 1983 [DE] Fed. Rep. of Germany ....... 3328032

[51] Int. Cl.$^4$ ............................................. B23D 81/00
[52] U.S. Cl. ..................................... 83/213; 83/471.2; 83/471.1; 83/519; 83/558; 83/563
[58] Field of Search ................... 83/471.2, 558, 471.3, 83/563, 213, 471.1, 564, 513, 519

[56] References Cited

U.S. PATENT DOCUMENTS

| | | | |
|---|---|---|---|
| 1,573,483 | 2/1926 | Enderes | 83/558 |
| 3,921,887 | 11/1975 | Machara et al. | 83/563 |
| 4,214,493 | 7/1980 | Elhaus | 83/471.2 |
| 4,433,467 | 2/1984 | Frick et al. | 83/513 |

Primary Examiner—Donald R. Schran
Attorney, Agent, or Firm—Laubscher & Laubscher

[57] ABSTRACT

An apparatus for severing extruded light sectional members is characterized by a combination of cutting saw and shears arranged at a common machine frame for alternative movement into operating position in a direction transversely of the sectional members, for severing either by the cutting saw or by the shears. The advantages of cutting by a saw and shearing are combined in this combination and the joining of two severing devices in a single structure helps save not only structural components but also space.

9 Claims, 4 Drawing Figures

APPARATUS FOR SEVERING EXTRUDED LIGHT SECTIONAL MEMBERS

BRIEF DESCRIPTION OF THE PRIOR ART

The invention relates to an apparatus for severing extruded light sectional members, particularly consisting of aluminum alloys.

Such apparatus are used for severing sectional members pulled out of the extruder by means of a puller on a run-out path when the desired length has been reached and the members are still hot enough for pressing. In practice cutting saws are used which are movable in pull-out direction laterally of the run-out path and which comprise a cantilever along which a saw carriage carrying the saw blade and the saw motor is movable into operating position transversely of the run-out path. Dividing the sectional members by the cutting saw described has the disadvantage of producing saw dust and making an uncomfortable sawing noise. It is an advantage that a cutting saw may be used to cut any desired cross sectional size of sectional material.

Instead of a cutting saw also shears are used for severing sectional members while still warm enough for pressing. Dividing by shears produces neither chips nor noise. Yet shears can be employed only for severing limited cross sections and there is the risk of squeezing the material together if the sectional members are hollow.

SUMMARY OF THE INVENTION

It is an object of the invention to design an apparatus for severing extruded light sectional members such that the advantages described of the known severing devices are combined in a single apparatus.

To meet this object it is provided, in accordance with the invention, that a cutting saw and shears are combined, a saw carriage carrying a motor and a saw blade of the cutting saw and a shear frame carrying the shearing blades being arranged on a common machine frame for movement into operating position into the path of the sectional members.

When using a cutting saw of known structure with which the saw carriage of the cutting saw is movable into and out of the operating position along a cantilever, it is provided in accordance with an advantageous modification of the invention that the shear frame is arranged for movement at the cantilever.

A structurally simple embodiment of the invention is characterized in that both the saw carriage and the shear frame are guided for movement along the cantilever by two tracks each and four guide rollers each.

A specific embodiment is advantageous in which the cantilever is embodied by an H beam, the cross piece of which is disposed horizontally and at the vertical leg insides of which a track each is arranged in the form of a sectional rod, the upper two sectional rods cooperating with two horizontal guide rollers each whose vertical axes are fitted in a shear frame disposed above the same, and the lower two sectional rods cooperating with two horizontal guide rollers each whose vertical axes are fitted in the saw carriage disposed below the same.

It is convenient to provide the shear frame overhung at the cantilever next to and outside of the saw blade and additionally guide it on a horizontal track at an extension of the cantilever by means of a guide roller disposed closely adjacent the shear frame.

It may be provided in accordance with another embodiment of the invention that the shear frame and the saw blade are arranged at opposed sides of the machine frame and that the machine frame is movable along the path of the sectional members so that the shear frame may be moved into the same working position as the saw blade with respect to the sectional members.

A preferred embodiment for avoiding undue flexing of the cantilever or providing distinct support during shearing as well as sawing is characterized in that beyond the path of the sectional members the cantilever is supported for movement on a guide path laterally of and parallel to the path of the sectional members by means of a support arm including a caster.

The cutting saw or shears also serve for positioning the puller, i.e. they fix the terminal position thereof which is set by the positioning of the cutting saw or shears along the horizontal track. In this context it is another advantage of the invention to have only one apparatus in which cutting saw and shears are combined.

The apparatus according to the invention permits to sever the extruded sectional members by the cutting saw or by the shears, depending on the type and cross section of the members, without having to provide two complete machine units. Instead considerable savings are achieved in component parts and space by having only one common machine frame and a structure which makes use of the same cantilever and the same guide elements.

If cross sectional shape and dimensions of the sectional members permit, the shears may be utilized for severing, whereby in many cases the production of chips and noise can be avoided. Sectional members of great cross sectional dimensions or a whole pack thereof and/or sectional members of hollow cross section with which there is a risk of squeezing, on the other hand, may be severed by the cutting saw.

BRIEF DESCRIPTION OF THE DRAWINGS

The invention will be described further, by way of example, with reference to the accompanying drawings, in which.

DETAILED DESCRIPTION

Figure 1:
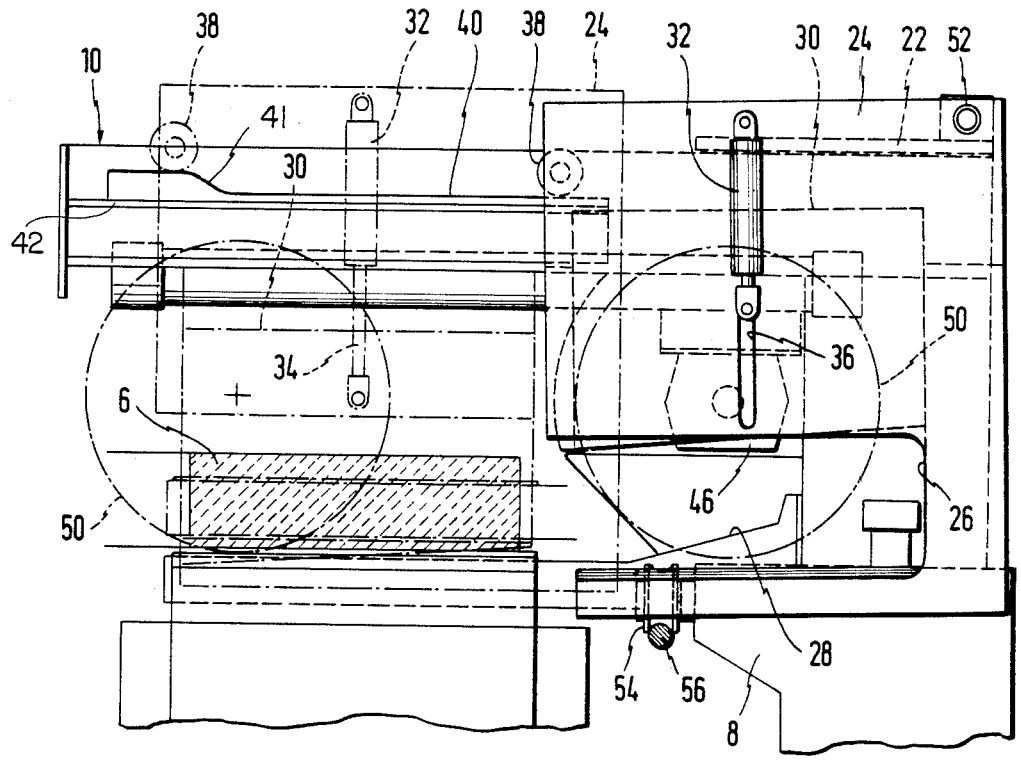
FIG. 1 is a side elevation.

In the figures reference numeral 2 designates the run-out path of the extruded sectional members coming from an extruder (not shown). 4 designates graphite beams which are disposed stationarily in transverse direction on the run-out path and on the surface of which the sectional members 6 are received which are pulled out along the run-out path by a puller (not shown).

A cantilever 10 in the form of an H beam whose cross piece 12 is disposed horizontally and whose legs 14 extend vertically is arranged at a machine frame 8. Round sectional rods 16 are welded to the insides of the legs 14 above the cross piece 12 and round sectional rods 18 are welded to the same below the cross piece 12, the upper and lower round sectional rods each lying in parallel horizontal planes.

Figure 2:
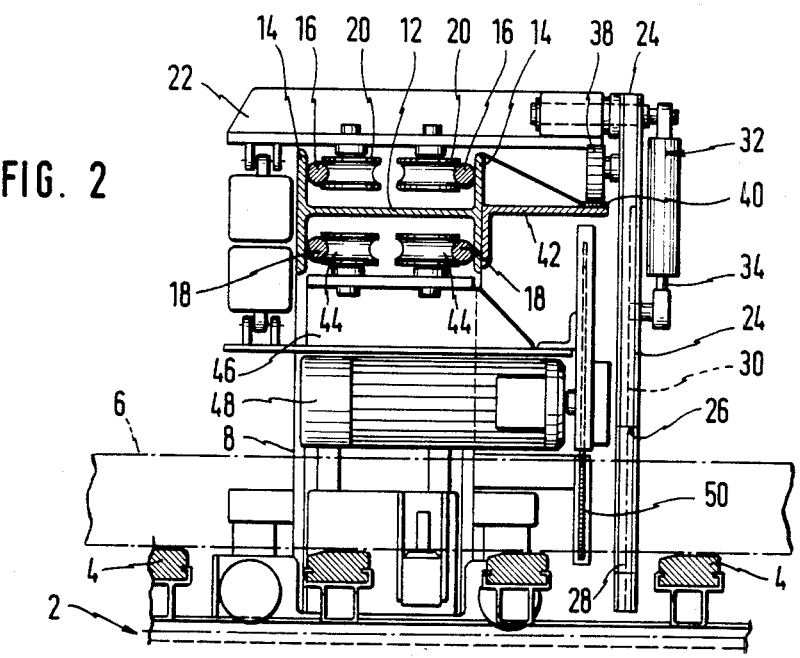
FIG. 2 is a front elevation, partly in section, of an apparatus according to the invention.

A total of four guide rollers 20 cooperate with the upper round sectional rods 16, and their upwardly protruding axes are fitted into a shear frame beam 22. This shear frame beam extends transversely across the cantilever 10 and carries a shear frame 24 in overhung arrangement at the right side, as seen in FIG. 2. In its lower region this shear frame 24 has a C-shaped opening 26 of such dimensions that it spans the width of the run-out path. A fixed lower blade 28 is arranged at the lower leg of the C-opening 26, while a vertically movable upper blade 30 is guided in the upper leg of the shear frame 24. The upper blade 30 is operable by a fluid cylinder 32 whose piston rod 34 is connected to the upper blade 30 through a slot 36 in the sidewall of the shear frame 24. As an alternative, the upper blade 30 may be pivotable. The shear frame 24 is guided on a horizontal track 40 by means of a guide roller 38 having a horizontal axis. The track 40 has a projection 41 at its end at the run-out path. The horizontal track 40 is fixed on an extension 42 of the cantilever 10.

Lower horizontal guide rollers 44 cooperate with the lower round sectional rods 18, and they are held by downwardly extending vertical axes in a saw carriage 46. The total of four guide rollers 44 thus guide the saw carriage horizontally along the cantilever 10. The saw carriage carries a saw motor 48 and a saw blade 50 coaxial with the motor and positioned closely adjacent the shear frame 24 and at the same side in the arrangement shown. This disposition of the shear frame 24 and saw blade directly adjacent each other is favorable because in severing the machine frame 8 may remain almost at the same position of the run-out path, irrespective of whether the cutting saw or the shears are used.

FIG. 1 shows both the cutting saw and the shears in their retracted inoperative position at the right and in operative position at the left side. In this operative position the saw carriage 46 with its saw blade 50 is shown extended from the inoperative position at the right into the left limit position in which the pack of sectional members 6 has been cut by the saw blade 50. Also shown at the left in FIG. 1 is the fluid cylinder 32 actuating the upper blade 30 and having its piston rod 34 extended to a position at which the upper blade has just severed the pack of sectional members 6.

In practice, of course, either the saw blade 50 alone or the shear frame 24 alone is moved into the left operative position as shown in FIG. 1, depending on whether sawing or shearing is desired.

It may further be taken from FIG. 1 that the shear frame 24 is connected to the shear frame beam 22 for pivoting about a horizontal axis 52. In this way the guide roller 38 may run up on the projection 41 of the track 40 so as to move the shear frame 24 into operative position (left in FIG. 1), the shear frame 24, at the same time, pivoting about axis 52. In this position the blade to be operated by fluid cylinder 32 is positioned exactly vertically above the sectional members to be sheared.

The machine frame 8 is adapted to be moved and positioned along the run-out path 2 by means of rollers 54 running on rails 56 so that the severing position along the sectional members may be selected at random. The design including the cantilever 10 and the C-opening 26 of the shear frame 24 permits the puller with its jaws to move through a limited distance under the cantilever 10 toward the extruder so as to grasp the beginning of a sectional member. Positioning of the machine frame 8 along the run-out path 2 also positions the puller. This is easier than if a cutting saw and separate shears must be positioned in adaptation to the positioning of the puller. The severing either by the cutting saw or by the shears takes place upon termination of the pulling procedure.

Figures 3, 4:
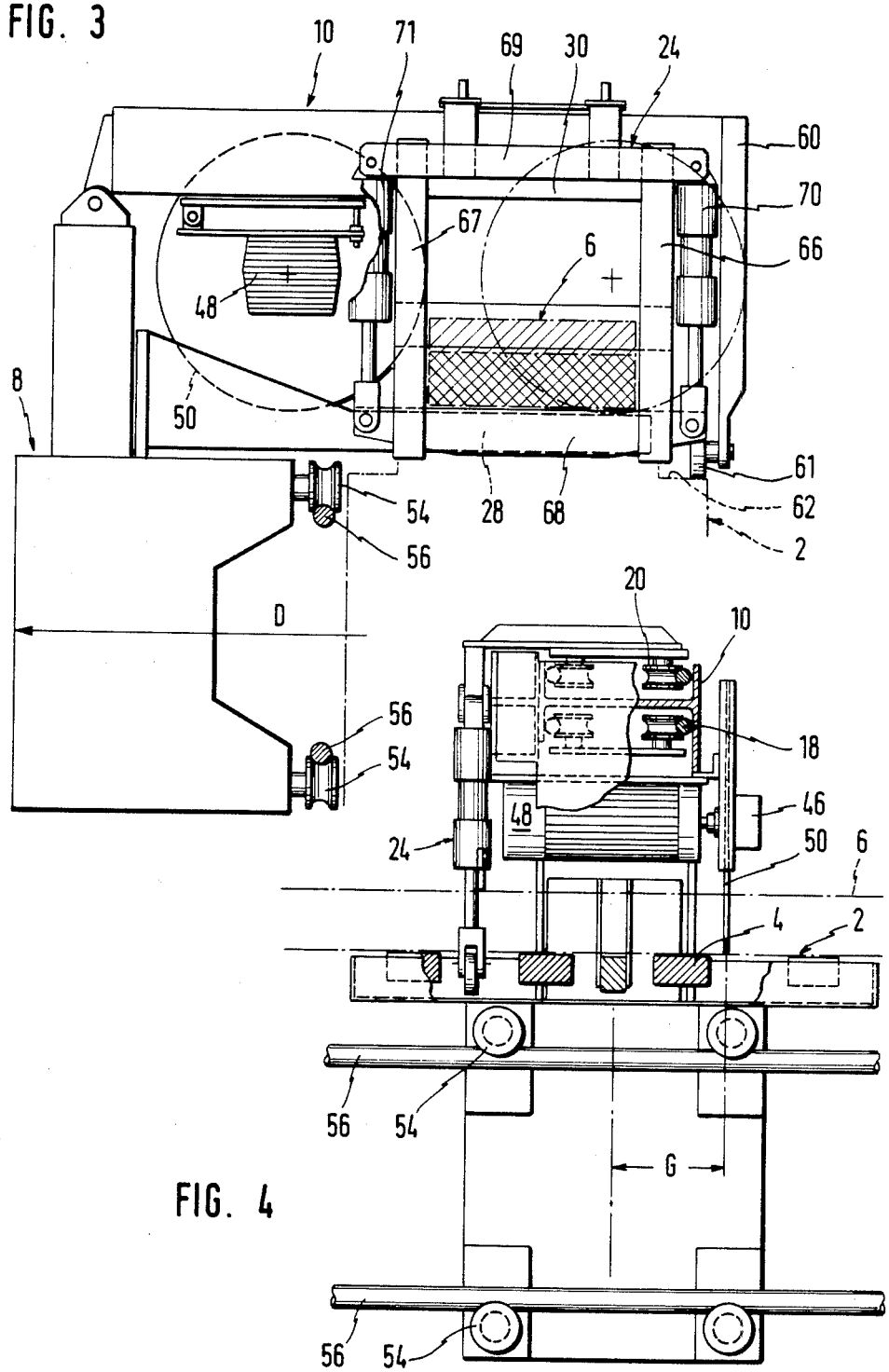
FIGS. 3 and 4 are, respectively, a side elevation and a front elevation, partly in section, of a modified embodiment of the invention.

For the sake of simplicity the same reference numerals as in FIGS. 1 and 2 are applied to similar members or members having similar functions in FIGS. 3 and 4. In this case the run-out path 2 and the extruded sectional members 6 to be severed are indicated by dash-dot lines. In FIG. 3 the sectional material thickness to be divided by the shears is shown by cross hatching, while oblique hatching indicates the thickness to be cut by the cutting saw. It is obvious from this presentation that a greater sectional member thickness can be handled by the cutting saw than by the shears.

As shown in FIG. 4, with this embodiment the shear frame 24 is diposed at the side of the machine frame 8 opposite from the saw blade 50.

As shown in FIG. 3, in this case the cantilever 10 is not arranged overhung but rather supported for displacement on a guide path 62 at the run-out path 2 and parallel to the same, by means of a support arm 60 including a roller or caster 61.

The shear frame 24 likewise supports a stationary lower blade 28 and a vertically movable upper blade 30. However, in this case the shear frame 24 is closed because of the following design:

The shear frame 24 comprises two vertical guide beams 66, 67 which are spaced apart by a distance which permits the passing of the run-out path 2 or of the sectional members 6. A lower transverse beam 68 which carries the lower blade 28 is firmly connected to the lower ends of the vertical guide beams 66,67. An upper transverse beam 69 carrying the upper blade 30 is movable vertically along the guide beams 66,67. Two pressure fluid cylinders 70,71 are disposed between the lower and upper transverse beams 68,69, outside of the guide beams 66,67 each. For shearing, these cylinders are operated in synchronism, thereby guiding the upper transverse beam 69 together with the upper blade 30 in vertical downward direction in the manner of a guillotine in order to effect shearing. As the cutting saw operates in the same manner as with the embodiment shown in FIGS. 1 and 2, it is not described again.

What is claimed is:

1. Apparatus for severing extruded light sectional members formed of an aluminum alloy or the like produced along an extruder runout path (2), comprising
   (a) a machine frame (8) mounted adjacent the extruder runout path, said frame including a cantilever (10) that extends horizontally over the runout path;
   (b) saw means connected with said cantilever for transverse movement between operative and retracted positions relative to said runout path, said saw means including a saw carriage (46), a motor (48) mounted on said carriage, and a saw blade (50) driven by said motor; and
   (c) shear means connected with said cantilever for movement between operative and retracted positions relative to said runout path, said shear means including a shear frame (24), and a pair of relatively movable shear knives (28,30) mounted on said shear frame.

2. Apparatus as defined in claim 1, and further including means for guiding each of the saw means and shear means for movement relative to said cantilever, each of said guide means including a pair of guide rails (16,18) connected with the cantilever, and two pairs of guide rollers (20,44) connected with the associated saw or shear means for cooperation with said guide rails.

3. Apparatus as defined in claim 2, wherein said cantilever comprises H beam having horizontal transverse and vertical flange portions, one pair of said guide rails (16) being horizontal and connected with the upper portions of said flanges and the other pair of said guide rails (18) being connected the lower portions of said flanges, said shear frame including a beam portion (22) that extends transversely over the cantilever, two pairs of said guide rollers being connected with said shear frame beam for cooperation with the upper guide rails, the other two pairs of guide rollers being connected with said saw carriage for cooperation with the lower two guide rails.

4. Apparatus as defined in claim 3, wherein said shear frame is arranged adjacent and outside said saw blade relative to said cantilever, and further wherein said shear frame includes a guide roller (38) arranged to engage a horizontal guide track (40) connected with said cantilever.

5. Apparatus as defined in claim 1, wherein said shear frame contains a C-shaped opening (26) for receiving a sectional member, cooperating lower and upper shear blades being mounted above and below the C-shaped opening.

6. Apparatus as defined in claim 1, and further including means (54,56) mounting said machine frame for movement longitudinally of the extruder runout path.

7. Apparatus as defined in claim 6, wherein said saw means and said shear means are mounted adjacent opposite sides of said machine frame.

8. Apparatus as defined as claim 7, and further including means including a vertical support arm (60) and a roller (61) cooperating with a fixed surface (62) on the runout path for supporting said cantilever.

9. Apparatus as defined in claim 2, wherein said shear frame includes a pair of vertical guide beams 66,67 arranged on opposite sides of the sectional members, and upper and lower horizontal guide beams arranged above and below the sectional members, and lower (28) and upper (30) shearing blades being connected with said upper and lower horizontal guide beams.

* * * * *